March 23, 1948.  F. E. FREY  2,438,315
DEHYDROGENATION OF 2,3-DIMETHYLBUTANE
Filed Jan. 3, 1944
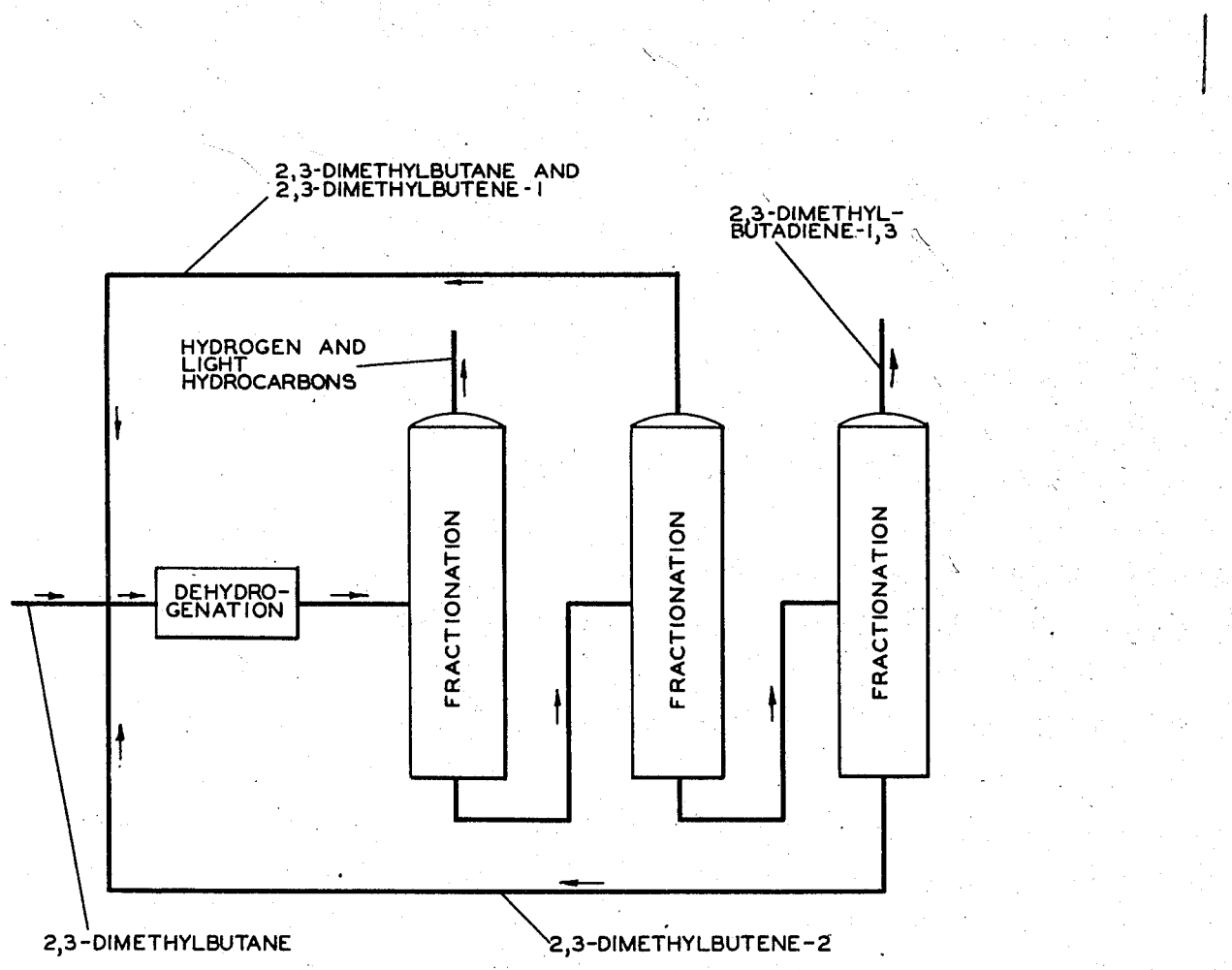
INVENTOR
F.E. FREY
BY Hudson, Young, & Ginger
ATTORNEYS Patented Mar. 23, 1948

2,438,315

UNITED STATES PATENT OFFICE 2,438,315

DEHYDROGENATION OF 2,3-DIMETHYL-BUTANE

Frederick E. Frey, Bartlesville, Okla., assignor to Phillips Petroleum Company, a corporation of Delaware Application January 3, 1944, Serial No. 516,799

2 Claims. (Cl. 260—680)

This invention relates to the dehydrogenation of hydrocarbons. More particularly, this invention relates to a process for the production of olefins and diolefins by the dehydrogenation of more saturated hydrocarbons containing the same number of carbon atoms per molecule and the same carbon skeleton structure as the desired product. The process of this invention is particularly applicable to the production of 2,3 dimethylbutadiene-1,3 by dehydrogenation of 2,3-dimethylbutane.

At the present time conjugated diolefins are of great importance in the manufacture of synthetic rubber. At the present time 1,3-butadiene is in great demand as a monomer for use in various copolymerization reactions to produce rubber-like materials. Other conjugated diolefins, such as pentadiene, isoprene and various members of the butadiene series have been used with other monomers for the production of elastic polymers. It is to be expected that many of the less well known members of the butadiene series will become important in the processes of making synthetic rubbers as the art develops.

The present invention is particularly concerned with the manufacture of 2,3-dimethylbutadiene-1,3. This conjugated diolefin of the butadiene series has been used as a monomer with 2-chlorobutadiene-1,3 to produce elastic polymers differing from the polymers obtained from pure chlorobutadiene.

The preparation of 2,3-dimethylbutadiene has been carried out by the reduction of acetone to pinacone and dehydration of the pinacone thus formed to 2,3-dimethylbutadiene. It has been suggested that 2,3 - dimethylbutadiene - 1,3 be made by the action of heated bases on pinacone chlorohydrin, and by dehydrochlorination of tetramethylethylene dichloride. By the process of the present invention 2,3-dimethylbutadiene-1,3 is made by a much more direct method, i. e. by dehydrogenation of more saturated hydrocarbons containing the same number of carbon atoms per molecule and the same carbon skeleton structure as 2,3-dimethylbutadiene-1,3.

This application is a continuation-in-part of my copending application, Serial No. 354,890, filed August 30, 1940, now Patent 2,371,817, granted March 20, 1945.

An object of this invention is to provide a process for producing olefins and diolefins from more saturated hydrocarbons of the same number of carbon atoms per molecule.

Another object of this invention is to provide a process to produce diolefin hydrocarbons by the dehydrogenation of paraffins.

Still another object of this invention is to provide a process for converting paraffins to diolefins in a single dehydrogenation step.

A further object of this invention is to provide an improved process for the production of 2,3-dimethylbutadiene-1,3.

It is also an object of this invention to provide a process by which 2,3-dimethylbutane may be converted to 2,3-dimethylbutadiene-1,3 by dehydrogenation under conditions which give good yields of 2,3-dimethylbutadiene-1,3.

Other objects of this invention will be evident from the following detailed description of the process.

I have found that 2,3-dimethylbutadiene-1,3 may be produced by dehydrogenation of 2,3-dimethylbutane in the presence of suitable catalysts. The dehydrogenation may be carried out in a single dehydrogenation step. In the dehydrogenation of 2,3-dimethylbutane in accordance with my invention, 2,3-dimethylbutene-1 and 2,3-dimethylbutene-2 are formed, together with 2,3-dimethylbutadiene-1,3. The 2,3-dimethylbutenes so formed may be converted to 2,3-dimethylbutadiene by dehydrogenation under the same conditions as 2,3-dimethylbutane is dehydrogenated. Thus, while the present invention is primarily concerned with the production of 2,3-dimethylbutadiene-1,3 from 2,3 dimethylbutane in a single catalytic dehydrogenation step, the process of the invention also involves and is applicable to the production of 2,3-dimethylbutenes from 2,3-dimethylbutane and the production of 2,3-dimethylbutadiene-1,3 from the 2,3-dimethylbutenes.

The process is illustrated by the accompanying drawing which is a flow diagram showing a suitable arrangement of apparatus for carrying out one embodiment of the invention. The drawing is substantially self-explanatory. In the illustrated embodiment 2,3-dimethylbutane (diisopropyl) in substantially pure state is charged to the dehydrogenation step which comprises suitable heating units or furnaces, catalyst chambers, and the like known to the art for effecting catalytic dehydrogenation. The 2,3-dimethylbutane is heated to a temperature within the range of about 1000 to 1100° F. and passed over the dehydrogenation catalyst comprising chromium oxide at relatively low pressure. Preferably the dehydrogenation pressure is subatmospheric; low pressure favors the dehydrogenation reaction. Due to difficulties inherent in low pressure operations, it may be preferable in some cases to operate at near-atmospheric or slightly elevated pressure. A low partial pressure of the hydrocarbon material present may be realized by admixing therewith a substantially inert gas as is known in the art.

The total effluent from the dehydrogenation is passed to a fractionation means wherein hydrogen and any light hydrocarbons formed by the scission of carbon-to-carbon bonds are removed as overhead. A $C_6$ fraction composed of unreacted 2,3-dimethylbutane, 2,3-dimethylbutenes, and 2,3-dimethylbutadiene is passed to a second fractionation means where it is separated into two fractions. The lower-boiling fraction comprising chiefly 2,3-dimethylbutane and 2,3-dimethylbutene-1 is removed as an overhead fraction and is recycled to the dehydrogenation means. The higher-boiling fraction comprising chiefly 2,3 dimethylbutene-2 and 2,3-dimethylbutadiene-1,3 is passed to a third fractionation means. The bottom product of the third fractionation comprises chiefly 2,3 dimethylbutene-2 which is recycled to the dehydrogenation to increase the yield of 2,3-dimethylbutadiene-1,3. The overhead product from the third fractionation comprising chiefly 2,3-dimethylbutadiene-1,3 is withdrawn as the desired product of the process. It will be evident to one skilled in the art that 2,3-dimethylbutene-1 and 2,3-dimethylbutene-2 are products of the dehydrogenation of 2,3-dimethylbutane. If desired, one or more of the 2,3-dimethylbutenes may be taken from the system as products. It will be evident also that 2,3-dimethylbutenes available from any other source may be fed into the process for conversion to 2,3-dimethylbutadiene-1,3 in accordance with my invention.

Chromium oxide catalysts known to be generally effective for catalytic dehydrogenation of petroleum hydrocarbons are suitable for use in my process. Preferably the catalyst comprises an alumina-chromia composition prepared as described in the copending applications of G. H. Morey, Serial No. 359,295, now Patent 2,339,349, granted January 18, 1944; J. D. Upham, Serial No. 478,028, now Patent 2,386,518, granted October 9, 1945; J. R. Owen, Serial No. 478,032, now Patent 2,386,499, granted October 9, 1945; or M. P. Matuszak, Serial No. 488,739, now Patent 2,418,470, granted April 1, 1947. The resulting catalytic material is essentially an aluminum oxide carrier impregnated with catalytically active chromium oxide.

Example

Pure diisopropyl (2,3-dimethylbutane) was volatilized in a stream of nitrogen and the mixture was passed for an hour over a chrome-alumina catalyst at atmospheric pressure, at an average temperature of 1097° F., at a space velocity of 540 volumes of diisopropyl vapor per volume of catalyst per hour, and at a total space velocity of 2770 gas volumes per volume of catalyst per hour. The composition of the total effluent was:

| Fraction | B. P., C. | Wt., Per cent |
|---|---|---|
| $C_5$ and lighter hydrocarbons | | 22.8 |
| 2,3-dimethylbutene-1 | 55.62 | 1.5 |
| 2,3-dimethylbutane | 57.99 | 63.5 |
| 2,3-dimethylbutadiene-1,3 | 68.9 | 8.0 |
| 2,3-dimethylbutene-2 | 73.24 | 1.8 |
| Deposit on catalyst | | 2.4 |
| Total | | 100.0 |

This result represents a conversion of 36.5 per cent of the diisopropyl and a once-through yield of diolefin of 21.9 per cent of the diisopropyl reacting.

I claim:

1. A process for the production of 2,3-dimethylbutadiene-1,3 which comprises admixing 2,3-dimethylbutane with an inert diluent, passing the resulting mixture into contact with a catalyst comprising alumina impregnated with chromium oxide at substantially atmospheric pressure and at a temperature of about 1100° F. and a space velocity of about 550 gas volumes of 2,3-dimethylbutane per volume of catalyst per hour and a total space velocity of about 2800 gas volumes per volume of catalyst per hour effecting conversion of 2,3-dimethylbutane to 2,3-dimethylbutene-1, 2,3-dimethylbutene-2, and 2,3-dimethylbutadiene-1,3.

2. The process of claim 1 in which said inert diluent is nitrogen, said 2,3-dimethylbutene-1 and 2,3-dimethylbutene-2 are separated from effluents of said catalyst and are introduced into the mixture passed into contact with said catalyst, and said 2,3-dimethylbutadiene-1,3 is recovered as a product of the process.

FREDERICK E. FREY.

REFERENCES CITED

The following references are of record in the file of this patent:

UNITED STATES PATENTS

| Number | Name | Date |
|---|---|---|
| 2,178,584 | Grosse | Nov. 7, 1939 |
| 2,209,215 | Wiezevich et al. | July 23, 1940 |
| 2,307,240 | Ruthruff | Jan. 5, 1943 |
| 2,335,550 | Sturgeon | Nov. 30, 1943 |